United States Patent
Ghafourifar et al.

(10) Patent No.: US 10,491,690 B2
(45) Date of Patent: Nov. 26, 2019

(54) DISTRIBUTED NATURAL LANGUAGE MESSAGE INTERPRETATION ENGINE

(71) Applicant: Entefy Inc., Palo Alto, CA (US)

(72) Inventors: Alston Ghafourifar, Los Altos Hills, CA (US); Brienne Ghafourifar, Los Altos Hills, CA (US); Mehdi Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 154 days.

(21) Appl. No.: 15/396,503

(22) Filed: Dec. 31, 2016

(65) Prior Publication Data

US 2018/0189347 A1 Jul. 5, 2018

(51) Int. Cl.
| | |
|---|---|
| G06F 17/30 | (2006.01) |
| H04L 29/08 | (2006.01) |
| H04W 48/18 | (2009.01) |
| G06F 16/2452 | (2019.01) |
| H04W 4/12 | (2009.01) |
| H04W 4/70 | (2018.01) |

(52) U.S. Cl.
CPC ........ H04L 67/16 (2013.01); G06F 16/24522 (2019.01); H04W 48/18 (2013.01); H04W 4/12 (2013.01); H04W 4/70 (2018.02)

(58) Field of Classification Search
CPC ...................................................... G06F 17/30
USPC ........................................................ 707/737
See application file for complete search history.

(56) References Cited

U.S. PATENT DOCUMENTS

| | | | |
|---|---|---|---|
| 5,481,597 A | 1/1996 | Given | |
| 5,951,638 A | 9/1999 | Hoss | |
| 6,101,320 A | 8/2000 | Schuetze | |
| 6,950,502 B1 | 9/2005 | Jenkins | |
| 7,450,937 B1 | 11/2008 | Claudatos | |
| 7,673,327 B1 | 3/2010 | Polis | |
| 7,680,752 B1 | 3/2010 | Clune, III | |
| 7,886,000 B1 | 2/2011 | Polis | |

(Continued)

FOREIGN PATENT DOCUMENTS

| | | |
|---|---|---|
| WO | 9931575 | 6/1999 |
| WO | 2013112570 A1 | 8/2013 |

OTHER PUBLICATIONS

Guangyi Xiao et al., "User Interoperability With Heterogeneous IoT Devices Through Transformation," pp. 1486-1496, 2014.

(Continued)

*Primary Examiner* — Kim T Nguyen
(74) *Attorney, Agent, or Firm* — Blank Rome LLP

(57) ABSTRACT

Disclosed are apparatuses, methods, and computer readable media for improved intelligent personal assistant (IPA) software agents that are configured to interact with various people, service providers, and/or smart devices across multiple connection protocols, communications formats, and communication protocols in a seamless and more accurate fashion. More particularly, but not by way of limitation, this disclosure relates to apparatuses, methods, and computer readable media for an improved Message Understanding Service (MUS) that is able to match generic user commands and queries (i.e., commands and queries that are not explicitly directed to a particular service endpoint or smart device) with the service endpoint(s) that have the greatest confidence level of being able to handle the generic command or query.

19 Claims, 10 Drawing Sheets

(56) References Cited

U.S. PATENT DOCUMENTS

| | | |
|---|---|---|
| 7,908,647 B1 | 3/2011 | Polis |
| 8,090,787 B2 | 1/2012 | Polis |
| 8,095,592 B2 | 1/2012 | Polis |
| 8,108,460 B2 | 1/2012 | Polis |
| 8,112,476 B2 | 2/2012 | Polis |
| 8,122,080 B2 | 2/2012 | Polis |
| 8,156,183 B2 | 4/2012 | Polis |
| 8,281,125 B1 | 10/2012 | Briceno |
| 8,296,360 B2 | 10/2012 | Polis |
| 8,433,705 B1 | 4/2013 | Dredze |
| 8,438,223 B2 | 5/2013 | Polis |
| 8,458,256 B2 | 6/2013 | Polis |
| 8,458,292 B2 | 6/2013 | Polis |
| 8,458,347 B2 | 6/2013 | Polis |
| 8,468,202 B2 | 6/2013 | Polls |
| 8,521,526 B1* | 8/2013 | Lloyd .................. G10L 15/197 704/236 |
| 8,527,525 B2 | 9/2013 | Fong |
| 8,706,737 B2* | 4/2014 | Cohen .............. G06F 16/24578 707/748 |
| 8,959,156 B2 | 2/2015 | Polis |
| 9,529,522 B1 | 12/2016 | Barros |
| 9,875,740 B1* | 1/2018 | Kumar .................... G10L 15/30 |
| 2002/0133509 A1 | 9/2002 | Johnston |
| 2002/0152091 A1 | 10/2002 | Nagaoka |
| 2002/0178000 A1 | 11/2002 | Aktas |
| 2002/0194322 A1 | 12/2002 | Nagata |
| 2004/0117507 A1 | 6/2004 | Torma |
| 2004/0137884 A1 | 7/2004 | Engstrom |
| 2004/0243719 A1 | 12/2004 | Roselinsky |
| 2004/0266411 A1 | 12/2004 | Galicia |
| 2005/0015443 A1 | 1/2005 | Levine |
| 2005/0080857 A1 | 4/2005 | Kirsch |
| 2005/0198159 A1 | 9/2005 | Kirsch |
| 2006/0193450 A1 | 8/2006 | Flynt |
| 2007/0054676 A1 | 3/2007 | Duan |
| 2007/0073816 A1 | 3/2007 | Kumar |
| 2007/0116195 A1 | 5/2007 | Thompson |
| 2007/0130273 A1 | 6/2007 | Huynh |
| 2007/0237135 A1 | 10/2007 | Trevallyn-Jones |
| 2007/0299796 A1 | 12/2007 | MacBeth |
| 2008/0062133 A1 | 3/2008 | Wolf |
| 2008/0088428 A1 | 4/2008 | Pitre |
| 2008/0112546 A1 | 5/2008 | Fletcher |
| 2008/0236103 A1 | 10/2008 | Lowder |
| 2008/0261569 A1 | 10/2008 | Britt |
| 2009/0016504 A1 | 1/2009 | Mantell |
| 2009/0119370 A1 | 5/2009 | Stern |
| 2009/0177477 A1 | 7/2009 | Nenov |
| 2009/0177484 A1 | 7/2009 | Davis |
| 2009/0177744 A1 | 7/2009 | Marlow |
| 2009/0181702 A1 | 7/2009 | Vargas |
| 2009/0271486 A1 | 10/2009 | Ligh |
| 2009/0292814 A1 | 11/2009 | Ting |
| 2009/0299996 A1 | 12/2009 | Yu |
| 2010/0057872 A1 | 3/2010 | Koons |
| 2010/0210291 A1 | 8/2010 | Lauer |
| 2010/0220585 A1 | 9/2010 | Poulson |
| 2010/0223341 A1 | 9/2010 | Manolescu |
| 2010/0229107 A1 | 9/2010 | Turner |
| 2010/0250578 A1 | 9/2010 | Athsani |
| 2010/0312644 A1 | 12/2010 | Borgs |
| 2010/0323728 A1 | 12/2010 | Gould |
| 2010/0325227 A1 | 12/2010 | Novy |
| 2011/0010182 A1 | 1/2011 | Turski |
| 2011/0051913 A1 | 3/2011 | Kesler |
| 2011/0078247 A1 | 3/2011 | Jackson |
| 2011/0078256 A1 | 3/2011 | Wang |
| 2011/0078267 A1 | 3/2011 | Lee |
| 2011/0130168 A1 | 6/2011 | Vendrow |
| 2011/0194629 A1 | 8/2011 | Bekanich |
| 2011/0219008 A1 | 9/2011 | Been |
| 2011/0265010 A1 | 10/2011 | Ferguson |
| 2011/0276640 A1 | 11/2011 | Jesse |
| 2011/0279458 A1 | 11/2011 | Gnanasambandam |
| 2011/0295851 A1 | 12/2011 | El-Saban |
| 2012/0016858 A1 | 1/2012 | Rathod |
| 2012/0209847 A1 | 8/2012 | Rangan |
| 2012/0210253 A1 | 8/2012 | Luna |
| 2012/0221962 A1 | 8/2012 | Lew |
| 2013/0018945 A1 | 1/2013 | Vendrow |
| 2013/0024521 A1 | 1/2013 | Pocklington |
| 2013/0067345 A1 | 3/2013 | Das |
| 2013/0097279 A1 | 4/2013 | Polls |
| 2013/0111487 A1 | 5/2013 | Cheyer |
| 2013/0127864 A1 | 5/2013 | Nevin, III |
| 2013/0151508 A1 | 6/2013 | Kurabayashi |
| 2013/0197915 A1 | 8/2013 | Burke |
| 2013/0262385 A1 | 10/2013 | Kumarasamy |
| 2013/0262852 A1 | 10/2013 | Roeder |
| 2013/0267264 A1 | 10/2013 | Abuelsaad |
| 2013/0268516 A1 | 10/2013 | Chaudhri |
| 2013/0304830 A1 | 11/2013 | Olsen |
| 2013/0325343 A1 | 12/2013 | Blumenberg |
| 2013/0332308 A1 | 12/2013 | Linden |
| 2014/0020047 A1 | 1/2014 | Liebmann |
| 2014/0032538 A1 | 1/2014 | Arngren |
| 2014/0149399 A1 | 5/2014 | Kurzion |
| 2014/0270131 A1 | 9/2014 | Hand |
| 2014/0280460 A1 | 9/2014 | Nemer |
| 2014/0297807 A1 | 10/2014 | Dasgupta |
| 2015/0039887 A1 | 2/2015 | Kahol |
| 2015/0095127 A1 | 4/2015 | Patel |
| 2015/0112971 A1 | 4/2015 | Wolfram |
| 2015/0120555 A1* | 4/2015 | Jung ..................... G06Q 20/40 705/44 |
| 2015/0149484 A1 | 5/2015 | Kelley |
| 2015/0186455 A1 | 7/2015 | Horling |
| 2015/0261496 A1 | 9/2015 | Faaborg |
| 2015/0278370 A1 | 10/2015 | Stratvert |
| 2015/0281184 A1 | 10/2015 | Cooley |
| 2015/0286747 A1 | 10/2015 | Anastasakos |
| 2015/0286943 A1 | 10/2015 | Wang |
| 2015/0339405 A1 | 11/2015 | Vora |
| 2016/0048548 A1 | 2/2016 | Thomas |
| 2016/0078030 A1 | 3/2016 | Brackett |
| 2016/0087944 A1 | 3/2016 | Downey |
| 2016/0092959 A1 | 3/2016 | Gross |
| 2016/0171450 A1* | 6/2016 | Perkins .............. G06Q 10/1093 705/7.18 |
| 2016/0173578 A1 | 6/2016 | Sharma |
| 2017/0039246 A1 | 2/2017 | Bastide |
| 2017/0039296 A1 | 2/2017 | Bastide |
| 2017/0206276 A1 | 7/2017 | Gill |
| 2017/0364587 A1 | 12/2017 | Krishnamurthy |
| 2017/0371965 A1* | 12/2017 | Davar .................. G06F 16/951 |
| 2018/0048661 A1 | 2/2018 | Bird |
| 2018/0101506 A1 | 4/2018 | Hodaei |
| 2018/0189347 A1* | 7/2018 | Ghafourifar ............ H04L 67/16 |

OTHER PUBLICATIONS

Marr, Bernard, Key Business Analytics, Feb. 2016, FT Publishing International, Ch. 17 "Neural Network Analysis" (Year: 2016).

* cited by examiner

DISTRIBUTED NATURAL LANGUAGE MESSAGE INTERPRETATION ENGINE

CROSS REFERENCE TO RELATED APPLICATIONS

This application is related to the commonly-assigned and co-pending non-provisional patent application having U.S. patent application Ser. No. 14/986,157, filed Dec. 31, 2015, entitled "Application Program Interface Analyzer for a Universal Interaction Platform" (hereinafter, "the '157 application"), which is hereby incorporated by reference in its entirety.

TECHNICAL FIELD

This disclosure relates generally to apparatuses, methods, and computer readable media for improved intelligent personal assistant software agents that are configured to interact with people, services, and devices across multiple communications formats and protocols.

BACKGROUND

Intelligent personal assistant (IPA) software systems comprise software agents that can perform various tasks or services on behalf of an individual user. These tasks or services may be based on a number of factors, including: spoken word input from a user, textual input from a user, gesture input from a user, a user's geolocation, a user's preferences, a user's social contacts, and an ability to access information from a variety of online sources, such as via the World Wide Web. However, current IPA software systems have fundamental limitations in natural language processing (NLP) and natural language understanding (NLU) in practical application. Some of these challenges have been addressed in the commonly-assigned and co-pending '157 application, which describes in detail a Universal Interaction Platform (UIP) having a new paradigm for Artificial Intelligence (AI)-based interactions with various third-party services and Internet-enabled, i.e., 'smart' devices, wherein each target service endpoint is treated similarly to a person for the sake of interactions with the user of a UIP-enabled device or application.

Using the techniques described in the '157 application, language context and action possibilities gleaned from user commands can be constrained by identifying the specific service that the user is sending the command to before attempting to perform any NLP/NLU—thus increasing the accuracy of results and significantly reducing the amount of processing work needed to understand the commands. However, this strategy may fall short in the context of AI-enabled IPAs, wherein the user may often engage in macro-level 'conversations' with his or her device via a generic query to a single IPA 'persona.' In such situations, it becomes more complex and challenging for the IPA to reliably direct the user's commands to the appropriate data, interface, third-party service, etc.—especially when a given command may seemingly apply with equal validity to two or more known third-party interfaces or services that the IPA software agent is capable of interfacing with.

The subject matter of the present disclosure is directed to overcoming, or at least reducing the effects of, one or more of the problems set forth above. To address these and other issues, techniques that enable intelligent, generic, yet context-aware communications between a user and an AI-driven IPA are described herein.

DETAILED DESCRIPTION

Disclosed are apparatuses, methods, and computer readable media for improved intelligent personal assistant (IPA) software agents that are configured to interact with various people, service providers, and/or smart devices across multiple communications formats and protocols in a seamless and intelligent fashion. More particularly, but not by way of limitation, this disclosure relates to apparatuses, methods, and computer readable media for an improved Message Understanding Service (MUS) that is able to match generic user commands and queries (i.e., commands and queries that are not explicitly directed to a particular service endpoint or smart device) with the service endpoint(s) that have the greatest confidence level of being able to handle the generic command or query.

Figure 1:
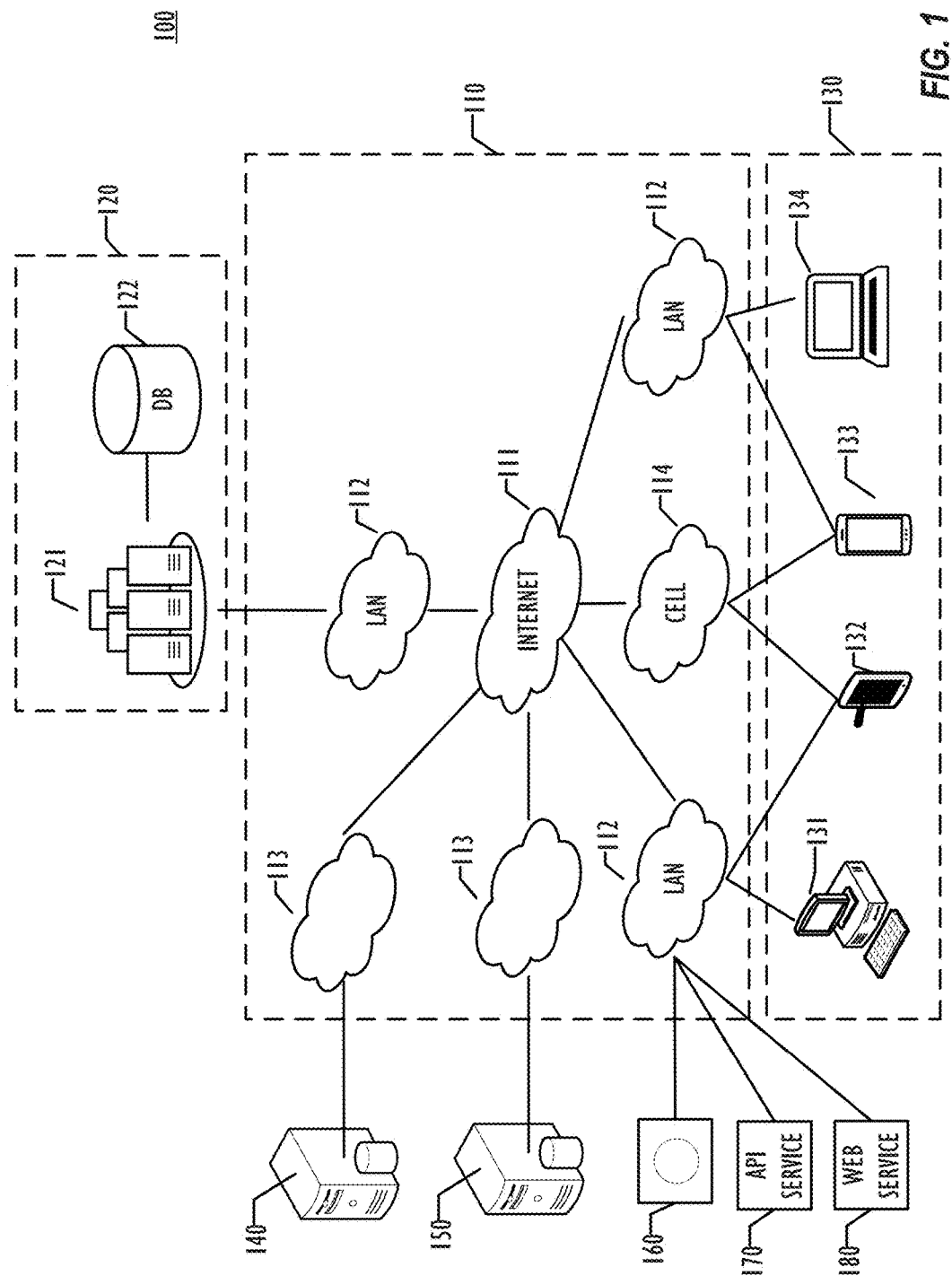
FIG. 1 is a block diagram illustrating a network architecture infrastructure, according to one or more disclosed embodiments.

Referring now to FIG. 1, a network architecture infrastructure 100 is shown schematically. The infrastructure 100 includes computer networks 110, interaction platform devices 120 (e.g., devices implementing a centralized communications system that allows users' client devices to seamlessly interact with any number of other client or third-party devices via any communications protocol and/or format), client devices 130, third-party communications devices 140, third-party service provider devices 150, smart devices 160, third-party 'API-enabled' services 170, and third-party 'Web-enabled' services 180.

The computer networks 110 may include any communications network that allows computers to exchange data, such as the internet 111, local area networks 112, corporate networks 113, cellular communications networks 114, etc. Each of the computer networks 110 may operate using any number of network protocols (e.g., TCP/IP). The computer networks 110 may be connected to each other and to the various computing devices described herein (e.g., the interaction platform devices 120, the client devices 130, the third-party communications devices 140, the third-party service provider devices 150, the smart devices 160, the third-party 'API-enabled' services 170, and the third-party 'Web-enabled' services 180) via hardware elements such as gateways and routers.

The interaction platform devices 120 may include one or more servers 121 and one or more storage devices 122. The one or more servers 121 may include any suitable computer hardware and software configured to provide the features disclosed herein. The storage devices 122 may include any tangible computer-readable storage media including, for example, read-only memory (ROM), random-access memory (RAM), magnetic disc storage media, optical storage media, solid state (e.g., flash) memory, etc.

The client devices 130 may include any number of computing devices that enable an end user to access the features disclosed herein. For example, the client devices 130 may include, for example, desktop computers 131, tablet computers 132, mobile phone 133, notebook computers 134, etc.

The third-party communications devices 140 may include email servers such as a GOOGLE® or YAHOO! ® email server (GOOGLE is a registered service mark of Google Inc. YAHOO! is a registered service mark of Yahoo! Inc.), third-party instant message servers such as a YAHOO! ® Messenger or AOL® Instant Messaging server (AOL is a registered service mark of AOL Inc.), third-party social network servers such as a FACEBOOK® or TWITTER® server (FACEBOOK is a registered trademark of Facebook, Inc. TWITTER is a registered service mark of Twitter, Inc.), cellular service provider servers that enable the sending and receiving of messages such as email messages, short message service (SMS) text messages, multimedia message service (MMS) messages, or any other device that enables individuals to communicate using any protocol and/or format.

The third-party service devices 150 may include any number of computing devices that enable an end user to request one or more services via network communication. The smart devices 160 may include any number of hardware devices that communicate via any of the computer networks 110 and are capable of being controlled via network communication. The third-party 'API-enabled' services 170 may include any number of services that communicate via any of the computer networks 110 and are capable of being controlled via an Application Programming Interface (API), such as a ride-sharing service. The third-party 'Web-enabled' services 180 may include any number of services that may have no direct third-party interface, other than informational content, e.g., information hosted on a third-party website or the like, such as a train schedule.

As described in more detail in the '157 application, the Universal Interaction Platform (UIP) allows users to interact with individuals, service providers, and smart devices 160 by sending a message (in the form of a message object) from a client device 130. The message object is output by the client device 130 for transmittal to the server 121. When the user is interacting with a service provider, the UIP may format an instruction for the third-party service device 150 associated with the service provider and output the instruction from the server 121 for transmittal to the third-party service device 150. Similarly, when the user is interacting with a smart device 160, the UIP may format an instruction for the smart device 160 and output the instruction from the server 121 for transmittal to the smart device 160. The server 121 may also receive a response from the third-party service device 150 or smart device 160, format a response message (e.g., in the form of a response message object) for the user, and output the response message object for transmittal to the client device 130.

Figure 2A:
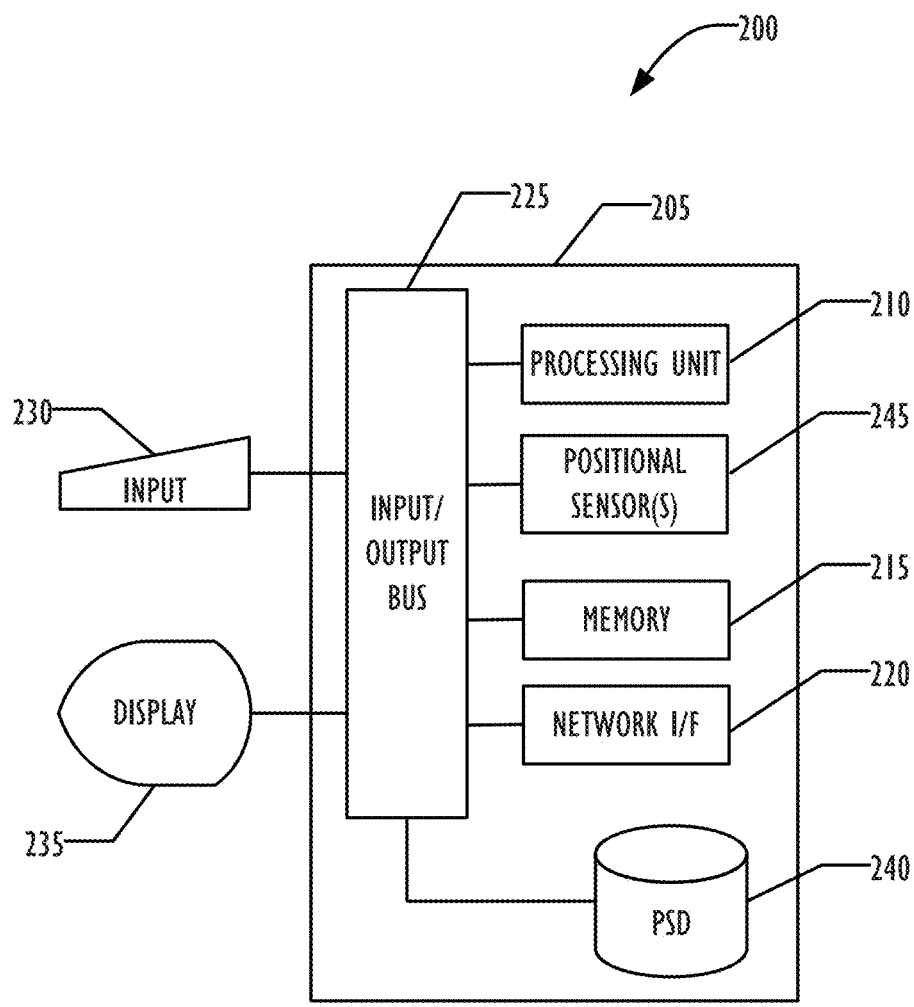
FIG. 2A is a block diagram illustrating a computer which could be used to execute the various processes described herein, according to one or more of disclosed embodiments.

Referring now to FIG. 2A, an example processing device 200 for use in the communication systems described herein according to one embodiment is illustrated in block diagram form. Processing device 200 may serve in, e.g., a server 121 or a client device 130. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
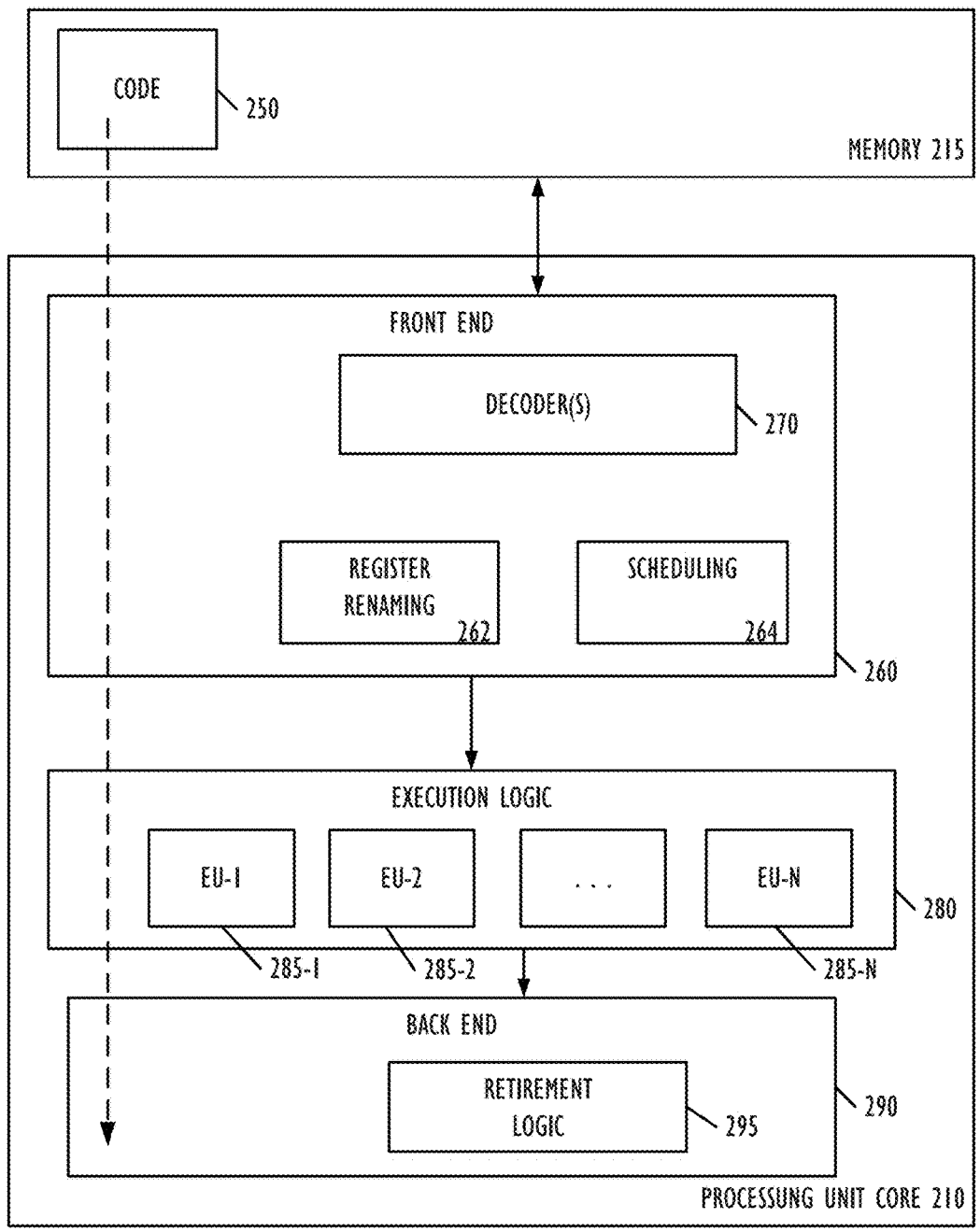
FIG. 2B is a block diagram illustrating a processor core, which may reside on a computer, according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Multi-Protocol, Multi-Format Inbox User Interface

Figure 3:
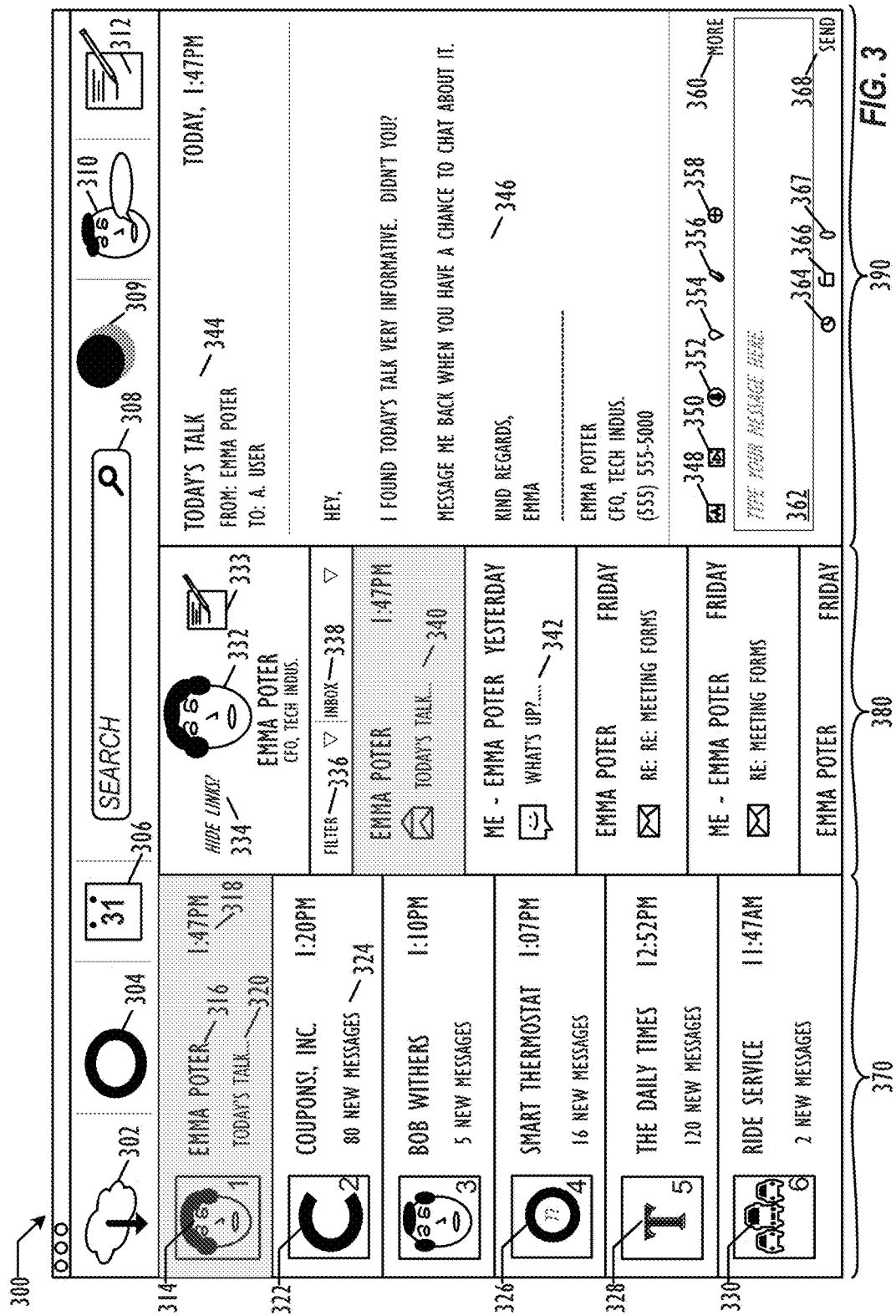
FIG. 3 shows an example of a multi-protocol, multi-format inbox, according to one or more disclosed embodiments.

FIG. 3 shows an example of a multi-protocol, person-centric, multi-format inbox user interface 300, according to one or more disclosed embodiments. The inbox user interface 300 shown in FIG. 3 may, e.g., be displayed on the display of a mobile phone, laptop computer, wearable, or other computing device. The inbox user interface 300 may have a different layout and configuration based on the type of device and/or size of display screen that it is being viewed on, e.g., omitting or combining certain elements of the inbox user interface 300. In certain embodiments, elements of inbox user interface 300 may be interacted with by a user utilizing a touchscreen interface or any other suitable input interface, such as a mouse, keyboard, physical gestures, verbal commands, or the like. It is noted that the layout and content of user interface 300 has been selected merely for illustrative and explanatory purposes, and in no way reflects limitations upon or requirements of the claimed inventions, beyond what is recited in the claims.

As is shown across the top row of the user interface 300, the system may offer the user convenient access to several different repositories of personalized information. For example icon 302 may represent a link to a personalized document repository page for a particular user. Such document repository may, e.g., comprise files shared between the particular user and the various recipients (e.g., email attachments, MMS media files, etc.). A user's personalized document repository may be fully indexed and searchable, and may include multimedia files, such as photos, in addition to other files, such as word processing and presentation documents or URL links.

Also shown in the top row of the user interface 300 is the icon 304, which may represent a link to all of the user of the inbox's interactions with other users, e.g., text messages, instant messages, emails, voicemails, etc. The illustrative user interface 300 is shown as though the icon 304 had been selected by a user, i.e., the three main content panes (370, 380, and 390), as illustrated in FIG. 3, are presently showing the user of the inbox's interactions, for illustrative purposes.

Also shown in the top row of the user interface 300 is the icon 306, which may represent a link to the user of the inbox's calendar of events. This calendar may be synchronized across multiple devices and with multiple third-party calendar sources (e.g., Yahoo!, Google, Outlook, etc.)

Also shown in the top row of the user interface 300 is a search box 308. This search box 308 may have the capability to universally search across, e.g.: all documents in the user's personalized document repository, all the user's historical interactions and their attachments, the user's calendar, etc. The search box 308 may be interacted with by the user via any appropriate interface, e.g., a touchscreen interface, mouse, keyboard, physical gestures, verbal commands, or the like.

Also shown in the top row of the user interface 300 is an IPA activation button 309. This IPA activation button 309 may have the capability to launch an IPA software agent. In some embodiments, the activating the IPA may comprise displaying a text box into which a user may enter textual commands or queries to be processed and acted upon by the IPA. Alternatively, or in addition, activating the IPA may cause a microphone of the user's device to begin listening for the user's verbal commands or queries. In still other embodiments, the system's IPA may always be 'listening' for user commands or queries (e.g., in response to the user reciting a unique IPA activation phrase), and thus not need to be specifically activated, e.g., via clicking on IPA activation button 309.

Also shown in the top row of the user interface 300 is the icon 310, which may represent a chat icon to initiate a real-time 'chatting' or instant messaging conversation with one or more other users. As may now be appreciated, chat or instant messaging conversations may also be fully indexed and searchable, and may include references to multimedia files, such as photos, in addition to other files, such as word processing and presentation documents or URL links that are exchanged between users during such conversations. The system may also offer an option to keep such conversations fully encrypted from the central communications server, such that the server has no ability to index or search through the actual content of the user's communications, except for such search and index capabilities as offered via other processes, such as those described in the commonly-assigned patent application bearing U.S. Ser. No. 14/985,907 ("the '907 application"), which is hereby incorporated by reference in its entirety.

Also shown in the top row of the user interface 300 is the icon 312, which may represent a compose message icon to initiate the drafting of a message to one or more other users. As will be described in greater detail below, the user may enter (and send) his or her message in any desired communications format or protocol that the system is capable of handling. Once the message has been composed in the desired format, the user may select the desired delivery protocol for the outgoing communication. Additional details regarding functionality for a universal, outgoing message composition box that is multi-format and multi-protocol may be found in the commonly-assigned patent application bearing U.S. Ser. No. 14/141,551 ("the '551 application"), which is hereby incorporated by reference in its entirety.

As may be understood, the selection of desired delivery protocol may necessitate a conversion of the format of the composed message. For example, if a message is entered in audio format, but is to be sent out in a text format, such as via the SMS protocol, the audio from the message would be digitized, analyzed, and converted to text format before sending via SMS (i.e., a speech-to-text conversion). Likewise, if a message is entered in textual format, but is to be sent in voice format, the text from the message will need to be run through a text-to-speech conversion program so that an audio recording of the entered text may be sent to the desired recipients in the selected voice format via the appropriate protocol, e.g., via an email message.

As is shown in the left-most content pane 370, the multi-format, multi-protocol messages received by a user of the system may be combined together into a single, unified inbox user interface, as is shown in FIG. 3. Row 314 in the example of FIG. 3 represents the first "person-centric" message row in the user's unified inbox user interface. As shown in FIG. 3, the pictorial icon and name 316 of the sender whose messages are aggregated in row 314 appear at the beginning of the row. The pictorial icon and sender name indicate to the user of the system that all messages that have been aggregated in row 314 are from exemplary user 'Emma Poter.' Note that any indication of sender may be used. Also present in row 314 is additional information regarding the sender 'Emma Poter,' e.g., the timestamp 318 (e.g., 1:47 pm in row 314), which may be used to indicate the time at which the most recently-received message has been received from a particular sender, and the subject line 320 of the most recently-received message from the particular sender. In other embodiments, the sender row may also provide an indication 324 of the total number of message (or total number of 'new' or 'unread' messages) from the particular sender. Additional details regarding functionality for a universal, person-centric message inbox that is multi-format and multi-protocol may be found in the commonly-assigned patent application bearing U.S. Ser. No. 14/168,815 ("the '815 application"), which is hereby incorporated by reference in its entirety.

Moving down to row 322 of inbox user interface 300, messages from a second user, which, in this case, happens to be a company, "Coupons!, Inc.," have also been aggregated into a single row of the inbox feed. Row 322 demonstrates the concept that the individual rows in the inbox feed are 'sender-centric,' and that the sender may be any of: an actual person (as in row 314), a company (as in rows 322 and 328), a smart, i.e., Internet-enabled, device (as in row 326), or even a third-party service that provides an API or other interface allowing a client device to interact with its services (as in row 330). Additional details regarding functionality for universally interacting with people, devices, and services via a common user interface may be found in the commonly-assigned patent application bearing U.S. Ser. No. 14/986,111 ("the '111 application"), which is hereby incorporated by reference in its entirety.

As may now be appreciated, the multi-protocol, person-centric, multi-format inbox user interface 300 of FIG. 3 may provide various potential benefits to users of such a system, including: presenting email, text, voice, video, and social messages all grouped/categorized by contact (i.e., 'person-centric,' and not subject-people-centric, subject-centric, or format-centric); providing several potential filtering options to allow for traditional sorting of communications (e.g., an 'email' view for displaying only emails); and displaying such information in a screen-optimized feed format. Importantly, centralization of messages by contact may be employed to better help users manage the volume of incoming messages in any format and to save precious screen space on mobile devices (e.g., such a display has empirically been found to be up to six to seven times more efficient that a traditional inbox format). Further, such an inbox user interface makes it easier for a user to delete unwanted messages or groups of messages (e.g., spam or graymail). The order of appearance in the inbox user interface may be customized as well. The inbox user interface may default to showing the most recent messages at the top of the feed. Alternatively, the inbox user interface may be configured to bring messages from certain identified "VIPs" to the top of the inbox user interface as soon as any message is received from such a VIP in any format and/or via any protocol. The inbox user interface may also alert the user, e.g., if an email, voice message, and text have all been received in the last ten minutes from the same person—likely indicating that the person has an urgent message for the user. The inbox user interface may also identify which companies particular senders are associated with and then organize the inbox user interface, e.g., by grouping all communications from particular companies together. In still other embodiments, users may also select their preferred delivery method for incoming messages of all types. For example, they can choose to receive their email messages in voice format or voice messages in text, etc.

As is displayed in the central content pane 380 of FIG. 3, the selection of a particular row in the left-most content pane 370 (in this case, row 314 for 'Emma Poter' has been selected, as indicated by the shading of row 314) may populate the central content pane 380 with messages sent to and/or from the particular selected sender. As shown in FIG. 3, central content pane 380 may comprise a header section 332 that, e.g., provides more detailed information on the particular selected sender, such as their profile picture, full name, company, position, etc. The header section may also provide various abilities to filter the sender-specific content displayed in the central content pane 380 in response to the selection of the particular sender. For example, the user interface 300 may provide the user with the abilities to: show or hide the URL links that have been sent to or from the particular sender (334); filter messages by some category, such as protocol, format, date, attachment, priority, etc. (336); and/or filter by different message boxes, such as, Inbox, Sent, Deleted, etc. (338). The number and kind of filtering options presented via the user interface 300 is up to the needs of a given implementation. The header section 332 may also provide a quick shortcut 333 to compose a message to the particular selected sender.

The actual messages from the particular sender may be displayed in the central pane 380 in reverse-chronological order, or whatever order is preferred in a given implementation. As mentioned above, the messages sent to/from a particular sender may comprise messages in multiple formats and sent over multiple protocols, e.g., email message 340 and SMS text message 342 commingled in the same messaging feed.

As is displayed in the right-most content pane 390 of FIG. 3, the selection of a particular row in the center content pane 380 (in this case, row 340 for 'Emma Poter' comprising the email message with the Subject: "Today's Talk" has been selected, as indicated by the shading of row 340) may populate the right-most content pane 390 with the actual content of the selected message. As shown in FIG. 3, the right-most content pane 390 may comprise a header section 344 that, e.g., provides more detailed information on the particular message selected, such as the message subject, sender, recipient(s), time stamp, etc. The right-most content pane 390 may also provide various areas within the user interface, e.g., for displaying the body of the selected message 346 and for composing an outgoing response message 362.

Many options may be presented to the user for drafting an outgoing response message 362. (It should be noted that the same options may be presented to the user when drafting any outgoing message, whether or not it is in direct response to a currently-selected or currently-displayed received message from a particular sender). For example, the user interface 300 may present an option to capture or attach a photograph 348 to the outgoing message. Likewise, the user interface 300 may present options to capture or attach a video 350 or audio recording 352 to the outgoing message. Other options may comprise the ability to: attach a geotag 354 of a particular person/place/event/thing to the outgoing message; add a file attachment(s) to the outgoing message 356, and/or append the user's current GPS location 358 to the outgoing message. Additional outgoing message options 360 may also be presented to the user, based on the needs of a given implementation.

Various outgoing message sending options may also be presented to the user, based on the needs of a given implementation. For example, there may be an option to send the message with an intelligent or prescribed delay 364. Additional details regarding delayed sending functionality may be found in the commonly-assigned patent application bearing U.S. Ser. No. 14/985,756 ("the '756 application"), which is hereby incorporated by reference in its entirety. There may also be an option to send the message with in a secure, encrypted fashion 366, even to groups of recipients across multiple delivery protocols. Additional details regarding the sending of secured messages across delivery protocols may be found in the commonly-assigned patent application bearing U.S. Ser. No. 14/985,798 ("the '798 application"), which is hereby incorporated by reference in its entirety. There may also be an option to send the message using a so-called "Optimal" delivery protocol 367.

The selection of the "Optimal" delivery option may have several possible implementations. The selection of output message format and protocol may be based on, e.g., the format of the incoming communication, the preferred format or protocol of the recipient and/or sender of the communication (e.g., if the recipient is an 'on-network' user who has set up a user profile specifying preferred communications formats and/or protocols), an optimal format or protocol for a given communication session/message (e.g., if the recipient is in an area with a poor service signal, lower bit-rate communication formats, such as text, may be favored over higher bit-rate communications formats, such as video or voice), and/or economic considerations of format/protocol choice to the recipient and/or sender (e.g., if SMS messages would charge the recipient an additional fee from his or her provider, other protocols, such as email, may be chosen instead).

Other considerations may also go into the determination of an optimal delivery option, such as analysis of recent communication volume, analysis of past communication patterns with a particular recipient, analysis of recipient calendar entries, and/or geo-location analysis. Other embodiments of the system may employ a 'content-based' determination of delivery format and/or protocol. For example, if an outgoing message is recorded as a video message, SMS may be de-prioritized as a sending protocol, given that text is not an ideal protocol for transmitting video content. Further, natural language processing techniques may be employed to determine the overall nature of the message (e.g., a condolence note) and, thereby, assess an appropriate delivery format and/or protocol. For example, the system may determine that a condolence note should not be sent via SMS, but rather translated into email or converted into a voice message. Additional details regarding sending messages using an Optimal delivery protocol may be found in the commonly-assigned patent application bearing U.S. Ser. No. 14/985,721 ("the '721 application"), which is hereby incorporated by reference in its entirety.

Another beneficial aspect of the multi-protocol, multi-format outgoing message composition system described herein is the ability to allow the user to send one message to the same recipient in multiple formats and/or via multiple protocols at the same time (or with certain formats/protocols time delayed). Likewise, the multi-protocol, multi-format outgoing message composition system also allows the user the ability to send one message to multiple recipients in multiple formats and/or via multiple protocols. The choice of format/protocol for the outgoing message may be made by either the system (i.e., programmatically) or by the user, e.g., by selecting the desired formats/protocols via the user interface of the multi-protocol, multi-format communication composition system.

Message Understanding Service (MUS)

Figure 4:
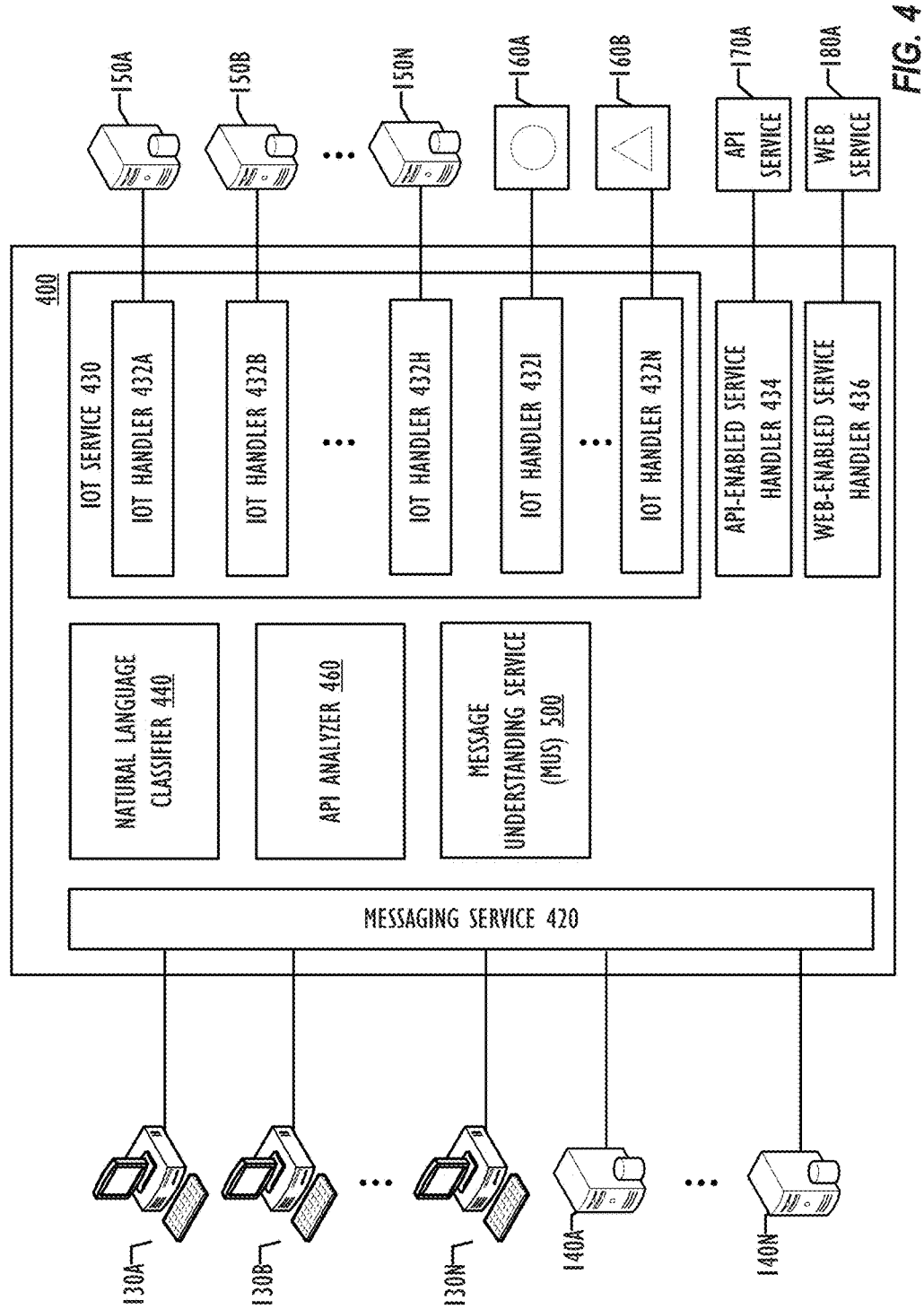
FIG. 4 is a block diagram of a Universal Interaction Platform including a Message Understanding Service, according to one or more disclosed embodiments.

Referring now to FIG. 4, one embodiment of a Message Understanding Service (MUS)-enabled Universal Interaction Platform (UIP) 400 is illustrated in further detail, according to one or more disclosed embodiments. The UIP 400 includes a messaging service 420, an IoT (Internet of Things) service 430, a natural language classifier 440, an API analyzer 460, and a Message Understanding Service 500. The IoT service 430 may include a number of individual IoT handlers 432. In this disclosure, an IoT handler may, e.g., be implemented as a software program or sub-program within the centralized communication system that directly interfaces with an autonomous, connected device that is, e.g., capable of specialized data collection, processing, and/or action. Examples of connected devices include, e.g., smart thermostats, smart televisions, IP-enabled cameras, home automation hubs, etc. The messaging service 420, the IoT service 430, the IoT handlers 432, the natural language classifier 440, the API analyzer 460, and the MUS 500 may be implemented as software modules stored on the storage device 122 and executed by the server 121.

The messaging service 420 sends and receives messages to and from the client devices 130 (e.g., via the inbox 300 and the interfaces 370, 380, 390, etc., as described above). The messaging service 420 also communicates with the third-party communications devices 140 as described, for example, in the various commonly-assigned patent applications, which are referenced above and incorporated by reference.

The IoT service 430 includes an IoT handler 432 for each service provider or smart device 160 supported by the universal interaction platform 400. Each IoT handler 432 may interact with a particular service provider or type (e.g., brand, model, etc.) of smart device 160. For example, IoT handler 432a may interact with a smart television, while IoT handler 432i may interact with the smart thermostat described above in row 326.

The API-Enabled Service Handler 434 may, e.g., be implemented as a software program or sub-program within the centralized communication system that directly interfaces with a third-party service (170a) that is made accessible using available APIs to perform specific functions that the corresponding service is able to perform, such as ordering a car from a ride sharing service, such as the service described above in row 330. According to some embodiments, API-Enabled Service Handler 434 may be adapted using the various processes set forth in the '157 application.

The Web-Enabled Service Handler 436 may, e.g., be implemented as a software program or sub-program within the centralized communication system that directly interfaces with a third-party product or service (180a) that is only made available via generic web connectivity, typically in the form of informational data, such as a website, online database, etc. According to some embodiments, Web-Enabled Service Handler 436 may be adapted using the various processes set forth in the '157 application.

The natural language classifier 440 is a machine learning tool that derives meaning from natural language by applying rules developed by analyzing corpora of real-world examples. As described in more detail in the '157 application, the corpora may include publicly-available data sets, as well as natural language documents collected by the UIP 400, such as messages output by users, descriptions of the services provided by the service providers, documentation regarding the services and the smart devices 160, etc. The universal interaction platform 400 enables users to interact with smart devices 160 and service providers via the multi-protocol, multi-format inbox 300 illustrated in FIG. 3. In some instances, the universal interaction platform 400 obtains information regarding a service provider by downloading publicly-available information regarding the service provider and storing that information in a structured data set such that the UIP 400 is able to respond to user queries.

In some instances, the UIP 400 may receive an indication from the user of precisely which service provider, smart device, etc. a given command or query should be sent to. For example, "Order a pizza from Frankie's." should be sent to a Frankie's Pizza service endpoint. In such instances, the MUS 500 may not need to be engaged by the UIP 400. By contrast, in some instances, the UIP 400 may receive a 'generic' command or query from the user of the device via the IPA, i.e., a command or query that is not specifically directed to a particular smart device 160 or service provider device 150. For example, "Order a pizza." may be a command that can be handled by various service endpoints known to the system. In instances of 'generic' commands or queries being received by the UIP 400, the MUS 500 may be engaged. The MUS 500 is a program that intercepts and interprets 'generic' commands or queries from the user of the device and delivers them, in parallel, to every service endpoint it has access to, and then wait for responses from each of the service endpoints. The MUS 500 may then aggregate, store, categorize and/or filter all of the responses and then take the appropriate actions on the command or query, e.g., by sending the command or query to the third-party service, smart device, etc. that is most likely to be able to handle the generic command or query. As will be explained in more detail below, according to some embodiments, the responses returned to the MUS 500 may also comprise an indication of whether or not a given service endpoint believes it can handle the command or query, as well as a confidence score associated with the indication of whether or not the service endpoint believes it can handle the command or query.

Figure 5A:
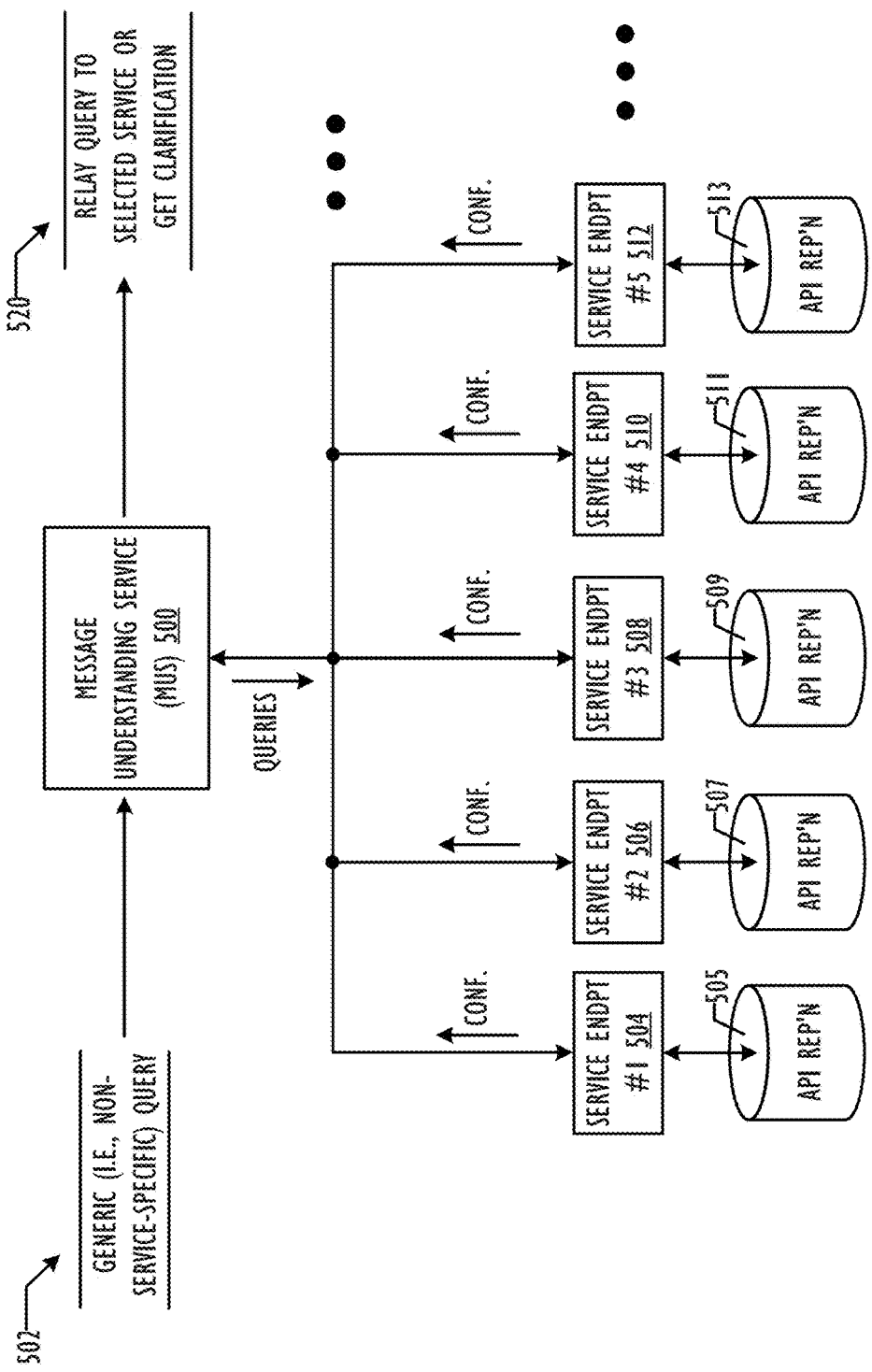
FIG. 5A is a block diagram of a Message Understanding Service, according to one or more disclosed embodiments.

FIG. 5A shows a block diagram of a Message Understanding Service 500, according to one or more disclosed embodiments. As described above, a generic, i.e., non-service-specific, query 502 may come into the MUS 500, e.g., via the IPA. Generic query 502 may be sent in the form of a universal messaging object or other messaging format that the MUS 500 is configured to interpret. According to some embodiments, the MUS 500 may then, in parallel, send the query 502 to every service endpoint it has access to, e.g., Service Endpoint #1 504, Service Endpoint #2 506, Service Endpoint #3 508, Service Endpoint #4 510, Service Endpoint #5 512, and so forth. Each service endpoint may have its own corresponding API representation, e.g., API Representation 505 for Service Endpoint #1, API Representation 507 for Service Endpoint #2, API Representation 509 for Service Endpoint #3, API Representation 511 for Service Endpoint #4, API Representation 513 for Service Endpoint #5, and so forth. As described in more detail in the '157 application, each API Representation may comprise a mapping of known API functions and parameters with natural language expressions. Based on how well the query 502 matches the known functions and parameters of a given service endpoint's API, the service endpoint may determine whether or not it believes it can handle the query 502, and what degree of confidence it has in that determination. In some embodiments, this determination may be broken down into an 'action-level' confidence value (i.e., the level of confidence that the service can handle the type of action(s) identified in the generic query) and/or a 'query-specific' confidence value (i.e., the level of confidence that the service can handle the specific action(s) requested in the generic query).

For example, in the case of the generic query, "Order a pizza," Dining-related services and Commerce-related services may have a high degree of confidence that they can handle an "Order"-related action command, whereas a Banking-related service may have a high degree of confidence that it cannot handle an "Order"-related action command. The determination of confidence value(s) of each service endpoint (e.g., an action-level confidence value and/or a query-specific confidence value) may then be returned and aggregated by the MUS 500 for further processing. Based on the aggregated responses, the MUS 500 may either relay the query 502 to the selected service 520 (i.e., in the case of a single service being identified as the only likely service to be able to handle the query) or attempt to get clarification from the user as to which service the query 502 is intended for (i.e., in the case of multiple services being identified as eligible to handle the query).

Figure 5B:
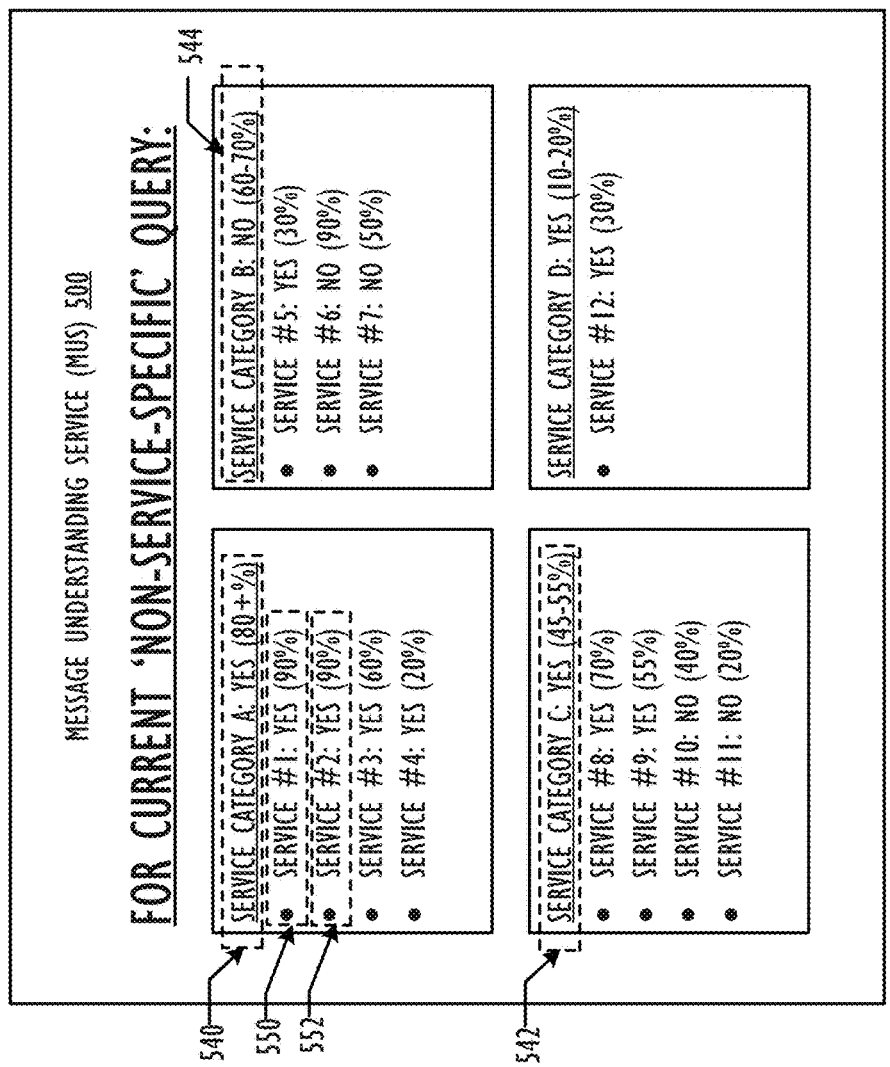
FIG. 5B is a block diagram of service filtering within a Message Understanding Service, according to one or more disclosed embodiments.

FIG. 5B shows a block diagram of service filtering within a Message Understanding Service, according to one or more disclosed embodiments. As the MUS begins to aggregate responses from the various service endpoints (along with their respective confidence values), it may first begin to cluster the services by category, e.g., Service Category A, Service Category B, Service Category C, and Service Category D, in the example of FIG. 5B. Example of service categories might include: Dining, Transportation, Commerce, Banking, Delivery, Information, etc.

In some embodiments, if a particular category of services (i.e., in the aggregate) has collectively answered "NO" as to the ability to handle the action type(s) identified in the generic query with more than a threshold level of confidence, that entire service category may be discarded as viable candidates for handling the generic query. For example, as is shown in the example of FIG. 5B, Service Category B 544 (of which Service #5, Service #6, and Service #7 are members) has responded "NO" with an action-level confidence ranging from 60-70%, so these services may be excluded as potential candidates for executing the generic query. Using the "Order a pizza" example discussed above, Service Category B may be comprised largely of services that do not know how to handle "Order"-related action commands, such as Banking services. Note, that, even within a Service Category with a low overall confidence level of being able to handle the action type (e.g., "Order"), there may be individual services that are outlier services that believe they can handle the command. For example, as shown in the example of FIG. 5B, Service #5 believes it can handle the Order-related query (albeit with a relatively low confidence level), perhaps because its API endpoint allows users to place "Money Orders" or "Order Checks," or has other callable functions that use the word "Order" or related words. In some embodiments, if an outlier service in a discarded (i.e, "NO") service category has greater than a threshold confidence level, it may still be passed to the user for consideration (or kept in consideration) to be the service of choice for a particular generic query.

By contrast, multiple service categories may have collectively answered "YES" as to the ability to handle the generic query having an "Order" action type with more than a threshold level of confidence. For example, as is shown in the example of FIG. 5B, Service Category A 540 (of which Service #1 550, Service #2 552, Service #3, and Service #4 are members) has responded "YES" with a range of 80+% confidence, and Service Category C 542 (of which Service #8, Service #9, Service #10, and Service #11 are members) has responded "YES" with a range of 45-55% confidence, so the services within these service categories may be considered further as potential candidates for executing the specific generic query being evaluated.

In some embodiments, the service category having the highest action-level confidence value may be considered first for potential service endpoint candidates, followed by the other service categories that are still considered as potential candidates. In other embodiments, only the service category having the highest action-level confidence value may be considered for potential service endpoint candidates. In the example of FIG. 5B, Service Category A 540 is the category with the highest confidence value, so it will be considered first. Using the "Order a pizza" example discussed above, Service Category A may be comprised largely of Dining services, e.g., services whose analyzed APIs indicate a high likelihood that they know how to handle "Order"-related action commands. Within Service Category A 540, individual service endpoint responses may be filtered by a 'query-specific' confidence value, i.e., a confidence that they can actually perform the requested generic query. In some embodiments, the filtering may comprise removing services having below a threshold query-specific confidence level value. In the example of FIG. 5B, Service #1 550 and Service #2 552 have the highest individual query-specific confidence levels at 90% so, presuming the query-specific confidence threshold was set at 75% in this particular example, both Service #1 550 and Service #2 552 would be identified by MUS 500 as eligible candidates for handling query 502. Using the "Order a pizza" example discussed above, Service #1 and Service #2 may be pizza restaurants and thus have a high confidence level that they can handle the "Order a pizza" command, whereas Service #3 might be an Italian-style restaurant that may be somewhat likely to sell pizzas, but from which the ability to order pizzas cannot be determined with a high level of confidence from the API analysis of Service #3. Finally, Service #4 may be a Mexican-style restaurant, from which the system knows it can order food, but is less confident that it can order a pizza.

In such situations where more than one service is identified as eligible (i.e., exceeding any query-specific confidence thresholds set up by the system), the user may be prompted for clarification as to which service to use, e.g., via an AI-generated prompt, such as: "Would you like to order your pizza from Service #1 (e.g., Frankie's Pizza) or Service #2 (e.g., Johnny's Pizza)?" In other embodiments with multiple eligible services, the system may simply choose the service with the highest confidence level, or the service that the user uses the most frequently, etc. If only a single service is identified, the system may simply pass the query 502 to the single identified service without waiting for any further clarification from the user. The system described above may have the advantageous effect that each query is first processed according to the NLP rules of each individual endpoint (which can be much more finely-tuned to the meaning of words to each individual service) for a confidence analysis, rather than the UIP 400 attempting to generically interpret the meaning of a query 'up-front,' i.e., with no clues as to the context or likely meaning of the words in the query. In other words, by side-stepping general purpose language parsing, and instead filtering the query with the unique parsing engine provided in each service, the system can better determine obvious matches, ambiguities, and unavailable/non-applicable commands. Filtering out services for whom the query is unavailable/non-applicable to early in the process, e.g., can significantly reduce unintended compute cycles, speed up overall processing time, and improve the accuracy of the system's query handling.

Figure 6A:
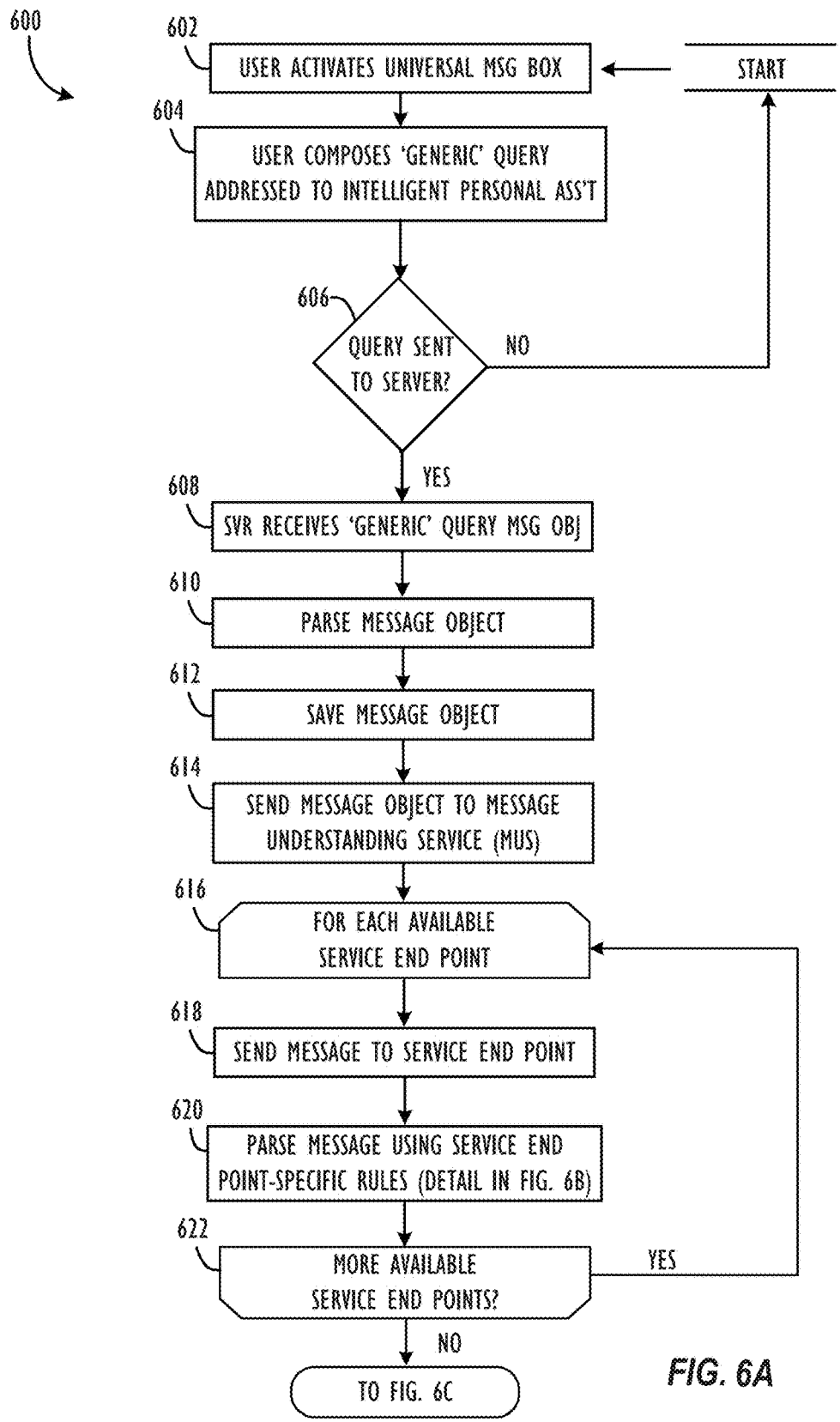
FIGS. 6A-6C show flowcharts for a method for determining the appropriate service endpoint for an IPA to route a generic user command to, according to one or more disclosed embodiments.

FIG. 6A shows a flowchart 600 of a method for determining the appropriate service endpoint for an IPA to route a generic user command to, according to one or more disclosed embodiments. First, at Step 602, the method may activate a universal messaging box. As discussed above, the universal messaging box may take the form of a graphical box into which a user may enter textual or verbal commands. In other embodiments, the system's IPA may always be 'listening' for user commands or queries (e.g., in response to the user reciting a unique IPA activation phrase), and thus not need to be messaging box that is specifically activated, e.g., via clicking on IPA activation button 309. Once the IPA is 'listening' for user input, at Step 604, the user may proceed to compose a 'generic' query addressed to the IPA, i.e., a query that is not specifically directed to a particular service endpoint. If, at Step 606, the query is successfully sent to the system's central communication server (i.e., "YES" at Step 606), the method may proceed to Step 608 for further processing. If, instead, the query is not successfully sent to the system's central communication server for any reason (i.e., "NO" at Step 606), the method may return to Step 602 and allow the user to attempt to resubmit the query.

At Step 608, the central communication server may receive the generic query, e.g., in the form of a universal messaging object or other data structure that the system uses for transmitting information. At Step 610, the system may parse the message object. The parsing at Step 610 may comprise high-level query parsing techniques, such as: identifying the sender of the query; identifying an intended recipient (if any) of the query; identifying the timestamp of the query; determining if there is a priority level associated with the query; separating the query into individual actions and objects, etc. The high-level query parsing techniques of Step 610 may also be used to confirm whether the query is indeed generic, or whether a likely specific intended service endpoint can be gleaned from the query. If an intended service endpoint can be gleaned from the query, then the query can be sent directly to the intended service endpoint (thus, skipping the remainder of the method of FIGS. 6A-6C), so that the more complex parsing techniques, such as NLP or NLU may be performed only by the intended service endpoint. As will be explained in greater detail below, the more complex parsing techniques, such as NLP or NLU, tend to be more context- or service-specific, thus it is not advantageous to perform them at this stage of analysis of a truly generic query, since the context and/or service that the query are intended for are still unknown to the system. At Step 612, the system may save the message object containing the generic query. Storing the query message object may allow the system to archive a copy of the query, index the query for future retrieval and/or analysis, and/or link the query to other similar queries received by the system.

At Step 614, the incoming generic query message object may be sent to the Message Understanding Service 500 (as discussed above with reference to FIG. 5A and FIG. 5B). At Step 616, the MUS may begin to process the generic query message object by sending the query to each available service endpoint known to the system. In some embodiments, the query may be sent to the service endpoints in a parallelized fashion, i.e., distributed to the various service endpoints at the same time, so that the responses may be received back in any order (and in the most timely fashion). In other embodiments, the query may be sent to the service endpoints in a serialized fashion, i.e., one at a time, or in some particular order, while awaiting the results of a first service endpoint before sending the query to the next service endpoint in the serial order. In still other embodiments, rather than sending the query to each available service endpoint known to the system, some filtering out of service endpoints may be performed at Step 616, e.g., excluding service endpoints not installed or known to the particular user, excluding service endpoints that are currently offline or no longer active, excluding service endpoints that can be ruled out as viable candidates without further detailed language analysis of the query, etc.

At Step 618, the generic query message object may be sent to one of the available service endpoints identified in Step 616. (As mentioned above, this process may be parallelized for each available service endpoint so that the query may be sent out to all the available service endpoints at the same time.) The service endpoint may comprise an API endpoint within the centralized communication system that understands the capabilities and properties of the particular service provider or smart device that it represents. Additionally, a service endpoint may also store and manage the necessary authentication tokens, instructions, etc., which may be necessary to allow the central communication system to interact with the respective service provider or smart device. At Step 618, the particular service endpoint receiving the query may parse the query message object using its service endpoint-specific rules. Processing the generic query with each individual service endpoint's NLP/NLU rules makes for a much more accurate understanding of the query (at least for the service endpoints that can understand/handle the query) than if a single, generic NLP/NLU engine was attempting to interpret the incoming query on behalf of the entire system. The aforementioned parallelization of sending query messages to the service endpoints may then continue until there are no more available service endpoint to send the query message to (Step 622). At that point, the process may proceed to Step 624 of FIG. 6C.

Figure 6B:
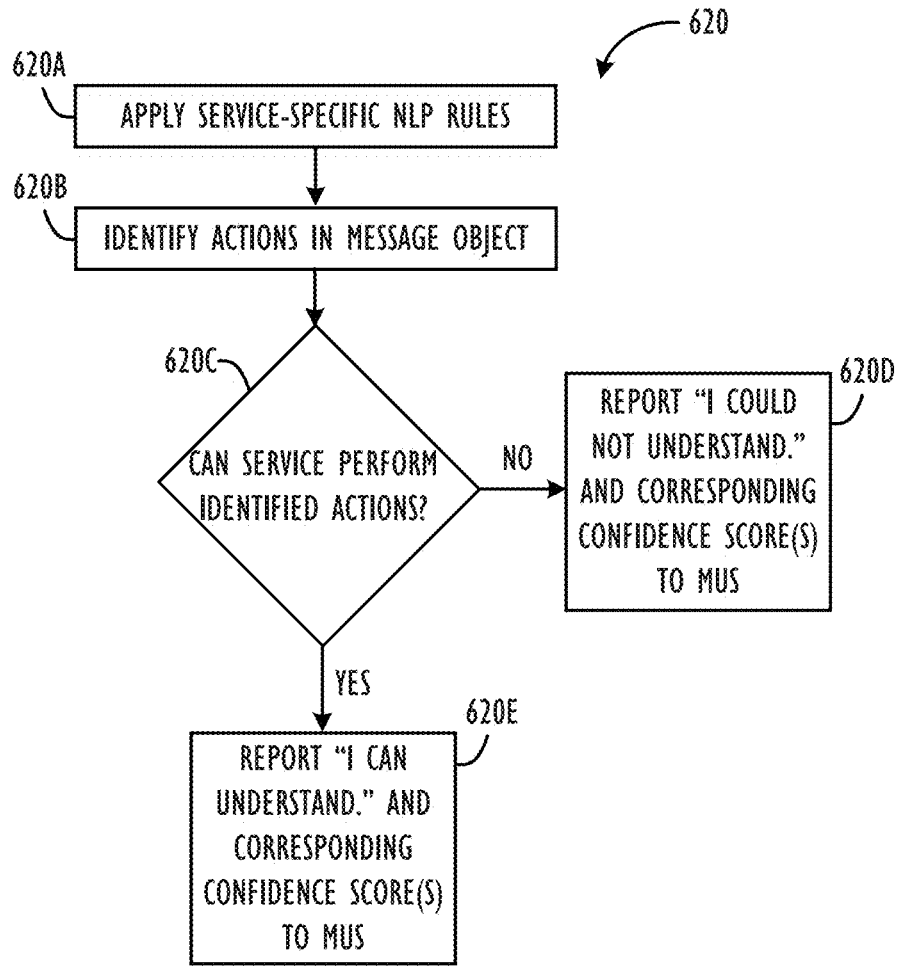

FIG. 6B shows additional detail behind Step 620 of flowchart 600 of FIG. 6A. In particular, once a generic query message object has been received at a given service endpoint, the service endpoint may apply its specific NLP rules to the content of the message object (Step 620A). Next, using the results of the service endpoint-specific NLP analysis, the service endpoint may identify the requested actions in the generic query message object, e.g., the 'ordering' action from the query: "Order a pizza"; the 'calling' action from the query: "Call me a cab"; the 'searching' action from the query: "What is the capital of Iceland?"; etc. (Step 620B). At Step 620C, the service determines whether or not it believes it can perform the identified action(s), e.g., via an API analysis or other technique used to characterize the abilities of a given service endpoint.

If, at Step 620C, the service endpoint determines that it cannot perform the identified action(s) (i.e., "NO" at Step 620C), the method may proceed to Step 620D, wherein the particular service endpoint will report back to the MUS that it does not understand/cannot handle the identified action, along with one or more corresponding confidence score values. As discussed above, according to some embodiments, each service endpoint may report back distinct confidence values as to whether the service endpoint believes it can perform the type of action identified (i.e., an 'action-level' confidence value), as well as whether the service endpoint believes it can perform the particular query currently being request by the user (i.e., a 'query-specific' confidence value). In other embodiments, the system may only evaluate and return a single confidence value as to whether the service endpoint believes it can perform the requested query.

If, instead, at Step 620C, the service endpoint determines that it can perform the identified action(s) (i.e., "YES" at Step 620D), the method may proceed to Step 620E, wherein the particular service endpoint will report back to the MUS that it does understand/can handle the identified action, along with one or more corresponding confidence score values. As discussed above, according to some embodiments, each service endpoint may report back distinct confidence values as to whether the service endpoint believes it can perform the type of action identified (i.e., an 'action-level' confidence value), as well as whether the service endpoint believes it can perform the particular query currently being request by the user (i.e., a 'query-specific' confidence value).

As discussed above, the confidence evaluation process of Step 620 may take place in parallel for each of the available service endpoints, with each service endpoint reporting its responses and confidence levels back to the MUS as such information is obtained.

Figure 6C:
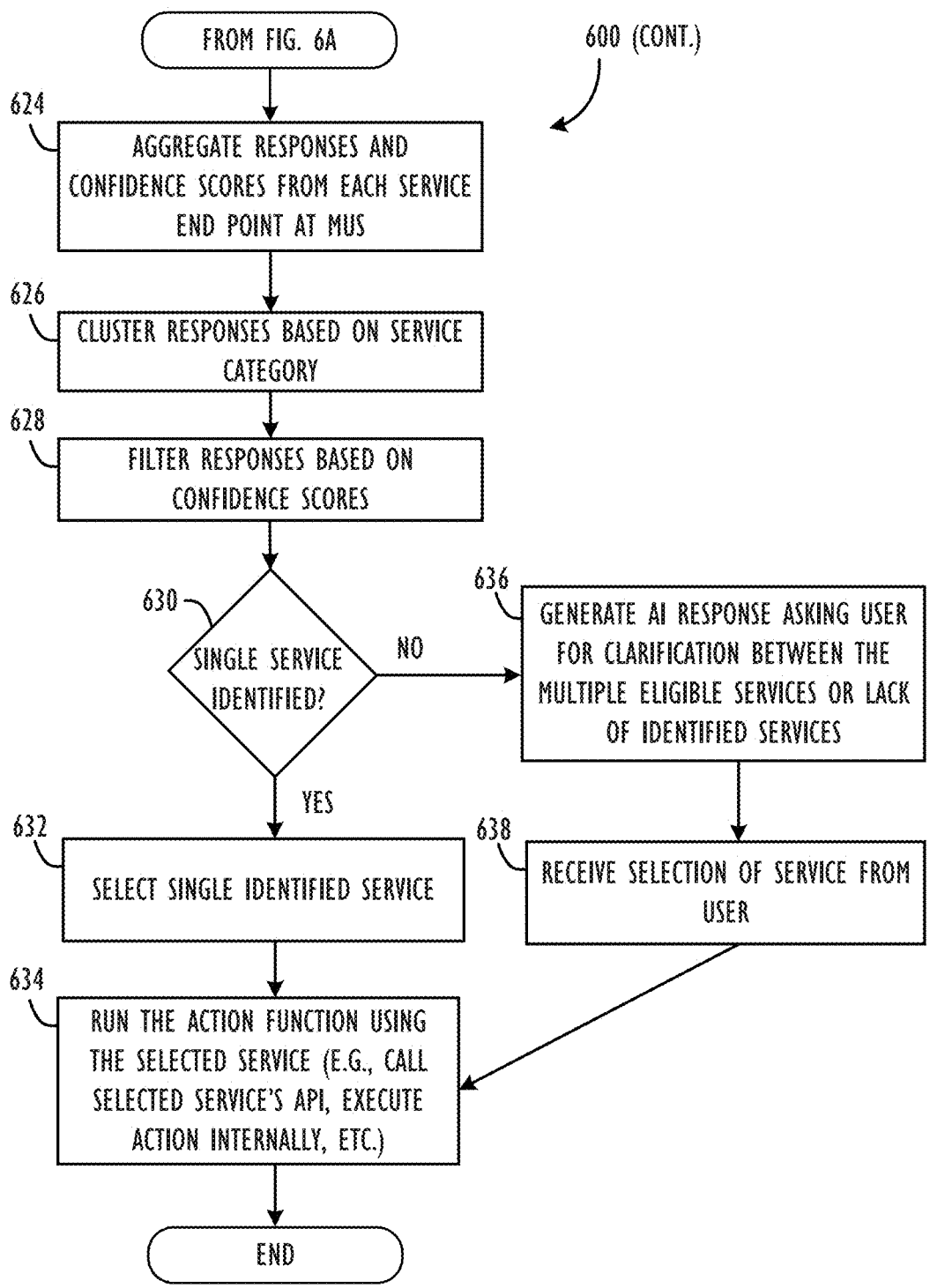

FIG. 6C shows a continuation of flowchart 600 from FIG. 6A, with additional details for the method for determining the appropriate service endpoint for an IPA to route a generic user command to. At Step 624, each of the responses and confidence score values from the various service endpoints are aggregated at the MUS for further evaluation. In particular, according to some embodiments, the process may proceed by clustering the response based on service categories (Step 626), e.g., as described above with reference to FIG. 5B. The category of each service may be known to the system in advance, or may be discernable to the system, e.g., based on an analysis of the service or device's API endpoint or a priori knowledge about the service or smart device's characteristics. As also described above with reference to FIG. 5B, each service category may be given an aggregate confidence value (or range of confidence values) based on the average (or range of) 'action-level' confidence values of the service endpoints in a given service category. According to some embodiments, one or more of the identified service categories may be discarded from consideration for performance of the current query, e.g., based on the aggregate confidence value of the category. Next, at Step 628, the process may filter the responses within each remaining service category (i.e., those service categories that have not been discarded from consideration), e.g., based on the 'query-specific' confidence values of each service in the category, i.e., the service's perceived confidence of being able to complete the current generic query that has been sent by a user. As mentioned above, according to some embodiments, the filtering of services may comprise discarding those services whose 'query-specific' confidence values do not exceed a predetermined threshold value.

At Step 630, if the result of the clustering and filtering processes of Steps 626 and 628, respectively, is that a single service endpoint has been identified as the best candidate for performing the generic query (i.e., "YES" at Step 630), the process may proceed to select the single identified service (Step 632) and then run the identified action(s) of the generic query using the selected service (Step 634). Running the identified action using the selected service may comprise, e.g.: calling the selected service's API with the appropriate parameters as extracted from the generic query message object; executing the identified action internally (i.e., without making a call to an external service); performing a search; performing a calculation operation; or otherwise finding the appropriate information requested by the generic query.

If, instead, at Step 630, the result of the clustering and filtering processes of Steps 626 and 628, respectively, is that multiple service endpoints (or no service endpoints) have been identified as being eligible candidates for performing the generic query (i.e., "NO" at Step 630), the process may proceed to Step 636 and generate an Artificial Intelligence-derived response asking the user for clarification between the multiple identified eligible service endpoints (or the lack of identified services). For example, with respect to the pizza ordering example described above, the system may generate a response at Step 636, such as: "Would you like to order your pizza from Frankie's Pizza [Eligible Service #1] or Johnny's Pizza [Eligible Service #2]?" Alternatively, if no services are identified, the system may generate a generic response at Step 636, such as: "Which service would you like to use to complete this query?"

At Step 638, the method receives the users selected service, and then proceeds to Step 634 to run the identified action(s) of the generic query using the selected service, as described above. Once the generic query has been executed, the process of method 600 may end, and the user's device may go back to listening for the next generic query from the user, so that the process may begin again at Step 602 of FIG. 6A.

EXAMPLES

The following examples pertain to further embodiments.

Example 1 is a computer-implemented method, comprising: receiving a first query from a user, wherein the first query is not explicitly directed to a particular service provider or smart device; determining a first plurality of available service providers and smart devices; identifying an application program interface (API) endpoint for each of the first plurality of available service providers and smart devices; for each of the identified API endpoints: using an endpoint-specific rule to identify at least a first action in the first query; and determining at least a first confidence value associated with the endpoint's ability to perform the first query; aggregating the at least a first confidence value from each of the identified API endpoints; determining at least one eligible service provider or smart device based, at least in part, on the aggregated first confidence values; selecting a first one of the at least one eligible service providers or smart devices; and executing the first query using the selected first eligible service provider or smart device.

Example 2 includes the subject matter of example 1, wherein the endpoint-specific rule for at least one of the identified API endpoints comprises a Natural Language Processing (NLP) or Natural Language Understanding (NLU) rule.

Example 3 includes the subject matter of example 1, further comprising: parsing the first query; and storing the first query in a memory.

Example 4 includes the subject matter of example 1, further comprising: determining a service provider category or smart device category for each of the identified API endpoints.

Example 5 includes the subject matter of example 4, wherein aggregating the at least a first confidence value from each of the identified API endpoints further comprises: clustering the first confidence values by service provider category or smart device category; and filtering the first confidence values according to a threshold value.

Example 6 includes the subject matter of example 1, wherein the identified first action has a type, and wherein the first confidence value associated with an endpoint's ability to perform the first query comprises a confidence that the endpoint can perform an action that is of the type of the identified first action.

Example 7 includes the subject matter of example 1, wherein selecting a first one of the at least one eligible service providers or smart devices further comprises: receiving a selection from the user of a first one of the eligible service providers or smart devices from among two or more service providers or smart devices determined to be eligible.

Example 8 includes the subject matter of example 1, wherein the act of determining at least a first confidence value is performed in parallel for each of the identified API endpoints.

Example 9 is a non-transitory computer readable storage medium comprising computer executable instructions stored thereon to cause one or more processing units to: receive a first query from a user, wherein the first query is not explicitly directed to a particular service provider or smart device; determine a first plurality of available service providers and smart devices; identify an API endpoint for each of the first plurality of available service providers and smart devices; for each of the identified API endpoints: use an endpoint-specific rule to identify at least a first action in the first query; and determine at least a first confidence value associated with the endpoint's ability to perform the first query; aggregate the at least a first confidence value from each of the identified API endpoints; determine at least one eligible service provider or smart device based, at least in part, on the aggregated first confidence values; select a first one of the at least one eligible service providers or smart devices; and execute the first query using the selected first eligible service provider or smart device.

Example 10 includes the subject matter of example 9, wherein the endpoint-specific rule for at least one of the identified API endpoints comprises a Natural Language Processing (NLP) or Natural Language Understanding (NLU) rule.

Example 11 includes the subject matter of example 9, further comprising instructions stored thereon to cause one or more processing units to: parse the first query; and store the first query in a memory.

Example 12 includes the subject matter of example 9, further comprising instructions stored thereon to cause one or more processing units to: determine a service provider category or smart device category for each of the identified API endpoints.

Example 13 includes the subject matter of example 12, wherein the instructions to aggregate the at least a first confidence value from each of the identified API endpoints further comprise instructions to cause the one or more processing units to: cluster the first confidence values by service provider category or smart device category; and filter the first confidence values according to a threshold value.

Example 14 includes the subject matter of example 9, wherein the identified first action has a type, and wherein the first confidence value associated with an endpoint's ability to perform the first query comprises a confidence that the endpoint can perform an action that is of the type of the identified first action.

Example 15 includes the subject matter of example 9, wherein the instructions to select a first one of the at least one eligible service providers or smart devices further comprise instructions to cause one or more processing units to: receive a selection from the user of a first one of the eligible service providers or smart devices from among two or more service providers or smart devices determined to be eligible.

Example 16 includes the subject matter of example 9, wherein the instructions to determine at least a first confidence value are executed in parallel for each of the identified API endpoints.

Example 17 is an apparatus comprising: a display; a memory; and one or more processing units, communicatively coupled to the memory, wherein the memory stores instructions configured to cause the one or more processing units to: receive a first query from a user, wherein the first query is not explicitly directed to a particular service provider or smart device; determine a first plurality of available service providers and smart devices; identify an API endpoint for each of the first plurality of available service providers and smart devices; for each of the identified API endpoints: use an endpoint-specific rule to identify at least a first action in the first query; and determine at least a first confidence value associated with the endpoint's ability to perform the first query; aggregate the at least a first confidence value from each of the identified API endpoints; determine at least one eligible service provider or smart device based, at least in part, on the aggregated first confidence values; select a first one of the at least one eligible service providers or smart devices; and execute the first query using the selected first eligible service provider or smart device.

Example 18 includes the subject matter of example 17, wherein the endpoint-specific rule for at least one of the identified API endpoints comprises a Natural Language Processing (NLP) or Natural Language Understanding (NLU) rule.

Example 19 includes the subject matter of example 17, wherein the instructions are further configured to cause the one or more processing units to: parse the first query; and store the first query in a memory.

Example 20 includes the subject matter of example 17, wherein the instructions are further configured to cause the one or more processing units to: determine a service provider category or smart device category for each of the identified API endpoints.

Example 21 includes the subject matter of example 20, wherein the instructions to aggregate the at least a first confidence value from each of the identified API endpoints further comprise instructions configured to cause the one or more processing units to: cluster the first confidence values by service provider category or smart device category; and filter the first confidence values according to a threshold value.

Example 22 includes the subject matter of example 17, wherein the identified first action has a type, and wherein the first confidence value associated with an endpoint's ability to perform the first query comprises a confidence that the endpoint can perform an action that is of the type of the identified first action.

Example 23 includes the subject matter of example 17, wherein the instructions to select a first one of the at least one eligible service providers or smart devices further comprise instructions configured to cause one or more processing units to: receive a selection from the user of a first one of the eligible service providers or smart devices from among two or more service providers or smart devices determined to be eligible.

Example 24 includes the subject matter of example 17, wherein the instructions to determine at least a first confidence value are configured to be executed in parallel for each of the identified API endpoints.

Example 25 includes the subject matter of example 17, wherein the first query received from the user comprises a verbal query.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A computer-implemented method, comprising:
receiving a first query from a user, wherein the first query is not explicitly directed to a particular service provider or smart device;
determining a first plurality of available service providers and smart devices;
identifying an application program interface (API) endpoint for each of the first plurality of available service providers and smart devices;
for each of the identified API endpoints:
determining a service provider category or smart device category for the endpoint;
using an endpoint-specific rule to identify at least a first action in the first query; and
determining at least a first confidence value associated with the endpoint's ability to perform the first query;
aggregating the at least a first confidence value from each of the identified API endpoints, wherein the aggregating comprises:
clustering the first confidence values by service provider category or smart device category; and
filtering the first confidence values according to a threshold value;
determining at least one eligible service provider or smart device based, at least in part, on the aggregated first confidence values;
selecting a first one of the at least one eligible service providers or smart devices; and
executing the first query using the selected first eligible service provider or smart device.

2. The method of claim 1, wherein the endpoint-specific rule for at least one of the identified API endpoints comprises a Natural Language Processing (NLP) or Natural Language Understanding (NLU) rule.

3. The method of claim 1, further comprising:
parsing the first query; and
storing the first query in a memory.

4. The method of claim 1, wherein the identified first action has a type, and wherein the first confidence value associated with an endpoint's ability to perform the first query comprises a confidence that the endpoint can perform an action that is of the type of the identified first action.

5. The method of claim 1, wherein selecting a first one of the at least one eligible service providers or smart devices further comprises:
receiving a selection from the user of a first one of the eligible service providers or smart devices from among two or more service providers or smart devices determined to be eligible.

6. The method of claim 1, wherein the act of determining at least a first confidence value is performed in parallel for each of the identified API endpoints.

7. A non-transitory computer readable medium comprising computer executable instructions stored thereon to cause one or more processing units to:
receive a first query from a user, wherein the first query is not explicitly directed to a particular service provider or smart device;
determine a first plurality of available service providers and smart devices;
identify an API endpoint for each of the first plurality of available service providers and smart devices;
for each of the identified API endpoints:
determine a service provider category or smart device category for the endpoint;
use an endpoint-specific rule to identify at least a first action in the first query; and
determine at least a first confidence value associated with the endpoint's ability to perform the first query;
aggregate the at least a first confidence value from each of the identified API endpoints, wherein the aggregating comprises:
clustering the first confidence values by service provider category or smart device category; and
filtering the first confidence values according to a threshold value;
determine at least one eligible service provider or smart device based, at least in part, on the aggregated first confidence values;
select a first one of the at least one eligible service providers or smart devices; and
execute the first query using the selected first eligible service provider or smart device.

8. The non-transitory computer readable medium of claim 7, wherein the endpoint-specific rule for at least one of the identified API endpoints comprises a Natural Language Processing (NLP) or Natural Language Understanding (NLU) rule.

9. The non-transitory computer readable medium of claim 7, further comprising instructions stored thereon to cause one or more processing units to:
parse the first query; and
store the first query in a memory.

10. The non-transitory computer readable medium of claim 7, wherein the identified first action has a type, and wherein the first confidence value associated with an endpoint's ability to perform the first query comprises a confidence that the endpoint can perform an action that is of the type of the identified first action.

11. The non-transitory computer readable medium of claim 7, wherein the instructions to select a first one of the at least one eligible service providers or smart devices further comprise instructions to cause one or more processing units to:
receive a selection from the user of a first one of the eligible service providers or smart devices from among two or more service providers or smart devices determined to be eligible.

12. The non-transitory computer readable medium of claim 7, wherein the instructions to determine at least a first confidence value are executed in parallel for each of the identified API endpoints.

13. An apparatus, comprising:
a display;
a memory; and
one or more processing units, communicatively coupled to the memory, wherein the memory stores instructions configured to cause the one or more processing units to:
receive a first query from a user, wherein the first query is not explicitly directed to a particular service provider or smart device;
determine a first plurality of available service providers and smart devices;
identify an API endpoint for each of the first plurality of available service providers and smart devices;
for each of the identified API endpoints:

determine a service provider category or smart device category for the endpoint;

use an endpoint-specific rule to identify at least a first action in the first query; and determine at least a first confidence value associated with the endpoint's ability to perform the first query;

aggregate the at least a first confidence value from each of the identified API endpoints, wherein the aggregating comprises:

clustering the first confidence values by service provider category or smart device category; and filtering the first confidence values according to a threshold value;

determine at least one eligible service provider or smart device based, at least in part, on the aggregated first confidence values;

select a first one of the at least one eligible service providers or smart devices; and execute the first query using the selected first eligible service provider or smart device.

14. The apparatus of claim 13, wherein the endpoint-specific rule for at least one of the identified API endpoints comprises a Natural Language Processing (NLP) or Natural Language Understanding (NLU) rule.

15. The apparatus of claim 13, wherein the instructions are further configured to cause the one or more processing units to:

parse the first query; and store the first query in a memory.

16. The apparatus of claim 13, wherein the identified first action has a type, and wherein the first confidence value associated with an endpoint's ability to perform the first query comprises a confidence that the endpoint can perform an action that is of the type of the identified first action.

17. The apparatus of claim 13, wherein the instructions to select a first one of the at least one eligible service providers or smart devices further comprise instructions configured to cause one or more processing units to:

receive a selection from the user of a first one of the eligible service providers or smart devices from among two or more service providers or smart devices determined to be eligible.

18. The apparatus of claim 13, wherein the instructions to determine at least a first confidence value are configured to be executed in parallel for each of the identified API endpoints.

19. The apparatus of claim 13, wherein the first query received from the user comprises a verbal query.

* * * * *